(12) United States Patent
Gelbard

(10) Patent No.: US 8,301,661 B2
(45) Date of Patent: Oct. 30, 2012

(54) GENERIC INFORMATION SYSTEM BUILDER AND RUNNER

(76) Inventor: Roy Gelbard, Tel Aviv (IL)

( * ) Notice: Subject to any disclaimer, the term of this patent is extended or adjusted under 35 U.S.C. 154(b) by 1946 days.

(21) Appl. No.: 10/839,190

(22) Filed: May 6, 2004

(65) Prior Publication Data

US 2005/0027752 A1 Feb. 3, 2005

Related U.S. Application Data

(60) Provisional application No. 60/490,271, filed on Jul. 28, 2003.

(51) Int. Cl.
*G06F 12/00* (2006.01)
*G06F 17/30* (2006.01)
(52) U.S. Cl. .......................... 707/792; 707/803
(58) Field of Classification Search ................ 707/1–10, 707/103, 792, 803
See application file for complete search history.

(56) References Cited

U.S. PATENT DOCUMENTS

| | | | | |
|---|---|---|---|---|
| 4,774,661 | A * | 9/1988 | Kumpati | 707/3 |
| 5,495,567 | A * | 2/1996 | Iizawa et al. | 715/762 |
| 5,881,378 | A * | 3/1999 | Hayashi et al. | 707/100 |
| 6,356,913 | B1 * | 3/2002 | Chu et al. | 707/103 R |
| 6,999,956 | B2 * | 2/2006 | Mullins | 707/2 |
| 7,103,600 | B2 * | 9/2006 | Mullins | 707/10 |
| 2003/0105732 | A1 * | 6/2003 | Kagalwala et al. | 707/1 |
| 2003/0120675 | A1 * | 6/2003 | Stauber et al. | 707/100 |
| 2004/0260715 | A1 * | 12/2004 | Mongeon et al. | 707/101 |

OTHER PUBLICATIONS

Elmasri et al; "Fundamentals of Database Systems" 3rd Edition Addison Wesley 2000 Chapter 2, pp. 23-39 Chapter 7, pp. 195-209.
Connolly et al; "Database Systems" 3rd Edition Addison Wesley 2000 Chapter 2, pp. 33-65 Chapter 15, pp. 440-475.
Sommerville; "Software Engineering" 6$^{th}$ Edition Addison Wesley 2001, Chapter 10. pp. 215-237.
Deitel et al; Visual Basic 6, Prentice Hall 1999 Chapter 2, pp. 25-49, Chapter 3 pp. 54-55, Chapter 16 pp. 694-695.

* cited by examiner

*Primary Examiner* — Shew-Fen Lin
(74) *Attorney, Agent, or Firm* — Mark M Friedman

(57) ABSTRACT

An information system (IS) architecture comprising an application environment operative to develop, run and edit on the fly any IS application, and a database environment coupled to the application environment and including a generic and rigid schema operative to represent all business and application components of any application in the application environment as records of the generic and rigid schema. The generic and rigid schema provides an on the fly capability to change any business component or application component in a run time application, thereby leaving the schema and the application environment unchanged during system operation.

5 Claims, 16 Drawing Sheets

| Entity_Types 402 |
|---|
| Entity_Type_Name |
| * Departments |
| Employees |
| Hour_Reports |

| Entity_Type_Attributes 404 | |
|---|---|
| Entity_Type_Name | Attribute_Name |
| * Departments | Dep_ID |
| * Departments | Dep_Name |
| Employees | SSN |
| Employees | First_Name |
| Employees | Last_Name |
| Employees | B_Date |
| * Employees | Dep_ID |
| Hour_Reports | SSN |
| Hour_Reports | Date |
| Hour_Reports | Start_Time |
| Hour_Reports | End_Time |

| Index_Components 412 | | |
|---|---|---|
| Entity_Type | Index_Name | Attribute_Name |
| * Departments | Primary_Key | Dep_ID |
| Employees | Primary_Key | SSN |
| Hour_Reports | Primary_Key | SSN |
| Hour_Reports | Primary_Key | Date |

| Relations 410 | |
|---|---|
| One_Side | Many_Side |
| * Departments | Employees |
| Employees | Hour_Reports |

| User_Interfaces | 602 |
|---|---|
| Interface_ID | Template_Name |
| Employee's report | Master-Details |

| Interface_Items | 604 | |
|---|---|---|
| Interface_ID | Template_Item_ID | Item_Link |
| Employee's report | M-1 | First_Name |
| Employee's report | M-2 | Last_Name |
| Employee's report | D-1 | Start_Time |
| Employee's report | D-2 | End_Time |

| Item_Display_Properties | | 606 | |
|---|---|---|---|
| Interface_ID | Template_Item_ID | Parameter_ID | Parameter_Value |
| Employee's report | M-1 | Position | (x,y) |
| Employee's report | M-1 | Style | A |
| Employee's report | M-2 | Position | (x,y) |
| Employee's report | M-2 | Style | B |
| Employee's report | D-1 | Style | C |
| Employee's report | D-2 | Style | D |

FIG. 14a

| User_Interfaces | 602 |
|---|---|
| Interface_ID | Template_Name |
| Employee's report | Master-Details |
| Department's employees | Master-Details |

| Interface_Items | | 604 |
|---|---|---|
| Interface_ID | Template_Item_ID | Item_Link |
| Employee's report | M-1 | First_Name |
| Employee's report | M-2 | Last_Name |
| Employee's report | D-1 | Start_Time |
| Employee's report | D-2 | End_Time |
| Employee's report | M-3 | Department-Name |
| Department's employees | M-1 | Department-Name |
| Department's employees | D-1 | Employee-First-Name |
| Department's employees | D-2 | Employee-Last-Name |
| Department's employees | D-3 | Employee-Birth-Date |

| Item_Display_Properties | | 606 | |
|---|---|---|---|
| Interface_ID | Template_Item_ID | Parameter_ID | Parameter_Value |
| Employee's report | M-1 | Position | (x,y) |
| Employee's report | M-1 | Style | A |
| Employee's report | M-2 | Position | (x,y) |
| Employee's report | M-2 | Style | B |
| Employee's report | D-1 | Style | C |
| Employee's report | D-2 | Style | D |
| Employee's report | M-3 | Position | (x,y) |
| Employee's report | M-3 | Style | E |
| Department's employees | M-1 | Position | (x,y) |
| Department's employees | M-1 | Style | B |
| Department's employees | D-1 | Style | A |
| Department's employees | D-2 | Style | A |
| Department's employees | D-3 | Style | B |

FIG. 14b

| Logic_Step | | 502 |
|---|---|---|
| Step_ID | Function_Name | Result_Alias |
| Step-1 | Addition | Transitional_Result |
| Step-2 | Multiplication | Final_Result |

| Step_Dependencies | 504 |
|---|---|
| Current_Step_ID | Previous_Step_ID |
| Step-2 | Step-1 |

| Step_Function_Param | | 506 |
|---|---|---|
| Step_ID | Parameter_ID | Parameter_Value_Link |
| Step-1 | 1 | A |
| Step-1 | 2 | B |
| Step-2 | 1 | Transitional_Result |
| Step-2 | 2 | C |

FIG. 15

GENERIC INFORMATION SYSTEM BUILDER AND RUNNER

CROSS REFERENCE TO RELATED APPLICATIONS

The present invention claims priority from U.S. Provisional Patent Application No. 60/490,271, filed 28 Jul. 2003, the content of which is incorporated herein by reference.

FIELD OF THE INVENTION

The present invention relates to information systems (IS), and specifically to the development and maintenance of IS applications.

BACKGROUND OF THE INVENTION

The description below uses the following definitions, which are provided here to improve the understanding:

Workflow (WF)—any sequence (or steps) of activities (steps of activities) required in order to accomplish an operation in the business world as well as in an application. Several actors, business and application components (see below) can be involved in the same workflow.

Business Component—a business entity, business logic, actor, activity, workflow and any of their sub-components.

Application Component—a screen, report, control, table, field, schema, and any other technical element of the information system (in the application environment as well as in the database environment).

Business Entity—an entity of the business world that is represented in the information system, such as a customer, an invoice, an employee, etc.

Business Logic—any business rule or calculation, such as commission, salary, etc.

Business Actor—a role that a user may play with respect to the system. Any actor-role has specific authorizations over each data item (see next).

Data Item—an attribute of a business component or a property of an application component. Any data item may be represented and stored as a field in the Generic Meta-Database rigid (GMD) schema of the present invention, as described in detail below.

Management System (M.S) of the database environment—the database engine/kernel that provides all operating utilities and services.

Management System (M.S) of the application environment—the engine/kernel of the development and execution of the IS application, which provides all operating utilities and services.

Editor in the context of an application environment—a framework wherein a developer can edit definitions and properties of a current application or business component (i.e. in a development mode).

Manager in the context of an application environment—an editor wherein an end user (with no programming background) can change definitions and properties of any application or business component in a run time mode of the application. All changes are codeless and refer to records changing (i.e., changing values of those records and/or adding new records and/or deleting records).

Business Data—values of data items related to business components.

Application Data—values of data items related to application components.

Run Time Application—executable state of an IS (after linking and compiling).

On the fly Total Application Editing—ability for codeless changing of any business component as well as any application component in a run time application.

FIG. 1 shows a typical architecture of a prior art information system 100. In the most general sense, IS 100 comprises an application environment 102 and a database environment 104. Communication and connectivity between the two environments is provided by a connection 106. Application environment 102 typically comprises one or more editors 110, for example a text editor for code editing in a text view, and a graphic editor for visual components editing in a graphical view, and a management system (M.S.) 112 used as application development and execution engine-kernel. M.S. 112 provides operating utilities and services, and is coupled to the editors and to external environments. Applications environment 102 further comprises application data 114 related to application component definitions and properties, which are used to define the specific appearance and behavior of each component. Database environment 104 (usually based on a commercial relational database management system (RDBMS)) typically comprises a specific business schema 116, which represents business entities that are specific for each application according to its functionality; a management system 118 used as a database development and execution engine-kernel, providing operating utilities and services, and is coupled to the schema and to external environments; and business data 120, stored in the schema. An example of a specific business schema 116 may be seen in FIG. 7.

Traditional application and database environments are described in detail in various sources in the literature. For example, the application environment (editors and components properties) is described in "Visual Basic 6" by H. M Deitel, P. J. Deitel and T. R. Neito, Prentice Hall, 1999. Specifically, chapter 2, pages 25-49 therein describe an integrated development environment, FIG. 3.6, p 55 describes a code window ("text editor"), and chapter 16.16, pages 694-695 describes an object browser. A system architecture is described in chapter 10, pages 215-238 of "Software Engineering" by I. Sommerville, Addison-Wesley, $6^{th}$ edition, 2001. The database environment (schema, management system and data) is described in "Fundamentals of Database Systems" by R. Elmasri and S. B. Navathe, Addison-Wesley, $3^{rd}$ Edition, 2000. Specifically, chapter 2, pages 23-39 therein describes database system concepts and architectures, chapter 7.1, pages 196-202 therein describes relational model concepts, and chapter 7.2, pages 202-208 describes relational constraints and relational database schemas. Further references may be found in "Database Systems" by T. Connolly and C. Begg, Addison-Wesley, $3^{rd}$ Edition, 2002. Specifically, chapter 2, pages 33-66 describes the database environment, and chapter 15, pages 440-475 describes the logical database design for the relational model.

In existing IS applications, specific business database schema 116 is designed according to the specific business objects and entities that are relevant to the required functional use of the specific system. It therefore relates to specific tables and specific business data items. Application components such as those related to user interfaces are specific as well, and handled as part of the application environment. Each specific component such as a field or a control on a screen has its definitions and properties, which are represented as data 114 in the application environment.

The development tools existing in prior art IS architectures are characterized by two main disadvantageous features: (a) the business schema is not stable to functional changes, because every business entity/object has to be represented in a separate table or tables. Moreover, each attribute of a business entity/object has to be represented in a separate field; (b) the application components and business components are defined and applied by code and not by application of general mechanisms on relevant data stored in a database. As a result, application development and maintenance processes in existing IS architectures are slow, complicated, and require extensive skilled human resources (programmers, database administrators, quality assurance manpower, etc.). For example, adding a new business entity, or adding or changing an attribute of a business entity (e.g. adding tables or fields) has significant consequences in terms of the need to update the application (screens, reports, logic, etc.), because the business schema is changed.

Therefore, it would be advantageous to provide an IS architecture based on a generic-rigid schema that represents not only business entities but also entire application and business components in a generic and rigid way. That is, it would be advantageous to have a generic-rigid schema that can embody and support any business functionality and any applicative functionality, without a need for any change or any adjustment in the database schema structure. A "generic way" as used herein can embody and support any business and applicative functionality; a "rigid way" as used herein can embody and support these functionalities in a fixed schema that needs no change or adjustment, no matter what the business or applicative changes are.

SUMMARY OF THE INVENTION

The present invention discloses an information system architecture, also referred to as a Generic Information System Builder and Runner (GBR), which is based on a generic rigid schema, also referred to as a GMD schema. Within the present context, "Builder" includes (and means) integrated development tools for defining all business and application components. "Runner" includes (and means) a capability for running in a production /execution mode. The GMD schema represents not only business entities but also entire business and application components in a generic way. The GMD schema can embody and support any business functionality and any applicative functionality, without its structure having to be changed or adjusted.

According to the present invention there is provided an information system architecture comprising: an application environment operative to develop, run and edit on the fly any IS application; and a database environment coupled to the application environment, the database environment including a generic and rigid schema operative to represent all business and application components of any IS application as records of the schema; whereby the generic business and application schema provides an on the fly capability to change any business component as well as any application component in a run time IS application, thereby leaving the database schema and the application environment unchanged during system editing, i.e. during system life time.

According to the present invention there is provided in an information system a database environment comprising business and applications data and a generic and rigid schema that stores all the business and applications data as records, the schema operative to provide an end user with a codeless on the fly capability to change any business and application component in a run time application mode, whereby the generic and rigid schema enables operation of the information system without a need to make any changes in the application environment, and whereby the operation of the information system provides an on the fly capability to change any business component as well as any application component in a run time IS application.

According to the present invention there is provided in an information system database environment a GMD schema comprising: a conceptual model operative to provide a logical representation of the GMD schema reflecting business and application components by records stored in the GMD schema; a relational database connectivity (RDBC) mechanism operative to provide connectivity between a traditional application and the records; and a storage mechanism operative to provide physical storage of the records including a physical differentiation between records related to different versions; whereby the GMD schema is operative to provide an end user with a codeless on the fly capability to change any business and application component in the information system in a run time application mode.

According to the present invention there is provided a method for developing and maintaining an information system that includes an application environment and a database environment, the environments including business components and application components, the method comprising the steps of: providing a GMD schema operative to represent all the business and application components as records; and using the generic and rigid schema to build, run and maintain the information system and to effect operations on the business and application components in a codeless way, by adding, deleting or changing values in the records, whereby the method provides an on the fly capability to change any business component as well as any application component in a run time IS application.

BRIEF DESCRIPTION OF THE DRAWINGS

The invention is herein described, by way of example only, with reference to the accompanying drawings, wherein:

FIG. 11 illustrates a mapping of the specific schema of FIG. 10b into the generic sub-schema of FIG. 4;

FIG. 13 shows an exemplary "master detail" template to be used according to the present invention;

FIG. 14a illustrates exemplary records of specific "master detail" user interfaces (screens), based on the "master detail" template of FIG. 13, for stage A of the "hours report" example of FIG. 10a.

FIG. 14b illustrates exemplary records of specific "master detail" user interfaces (screens), based on the "master detail" template of FIG. 13, for stage B of the "hours report" example of FIG. 10b.

FIG. 15 shows exemplary records, used for representing logics calculations according to the generic sub-schema of FIG. 5.

DESCRIPTION OF THE PREFERRED EMBODIMENTS

The present invention discloses an innovative IS architecture that includes a generic and rigid schema, a schema that enables representation of any business component and any application component of an information system as records in that schema. The architecture disclosed herein provides on the fly ability to add, change and delete any business data item, as well as make any change in the referential relations between these data items over the run time application, without a need to produce a new application version or an ad-hoc patch. The architecture disclosed herein also provides on the fly ability to define and to change user authorizations to any data items, without a need to produce a new application version or an ad-hoc patch. The architecture disclosed herein further provides on the fly ability to change user interfaces, without a need to produce a new application version or an ad-hoc patch. The architecture disclosed herein further provides on-the fly ability to define and to change business logics, transaction rules and workflow processes, without a need to produce a new application version or an ad-hoc patch. These inventively enabling features of the architecture of the present invention provide an end-user with the ability to make all needed business functional definitions and changes in an IS application on the fly, without need for a programming background and programming skills.

Figure 2A:
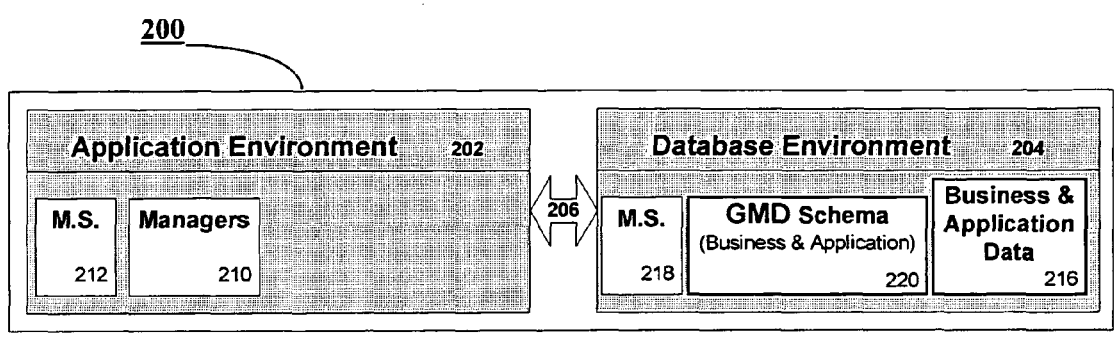
FIG. 2a shows schematically an information system architecture according to the present invention.

FIG. 2a shows schematically an IS architecture according to the present invention. As in prior art, the IS may be represented as comprising an application environment 202 and a database environment 204, communicating (connected) through a communication link (connection) 206. Application environment 202 comprises one or more GBR editors 210 (also called managers or editors-managers) and a GBR management system (M.S.) 212. However, in contrast with prior art, application environment 202 does not comprise any data related to definition or properties of application components. The latter are now part of database environment 204. GBR management system 212 supports the GBR capabilities of handling business components and application components, as well as operating utilities and services. Moreover, the GBR management system supports version controlling by ensuring usage of the right version of each component, and supports backward and forward compatibility of entities, logics, processes and displays.

Figure 1:
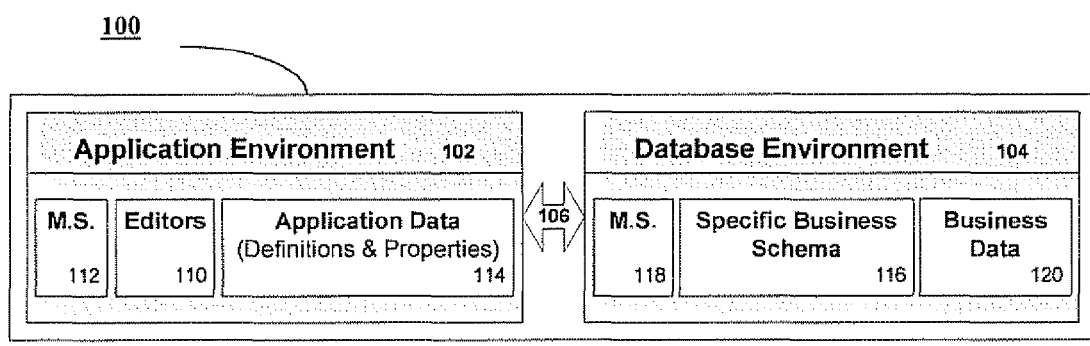
FIG. 1 shows schematically a typical prior art information system architecture.
Figure 4:
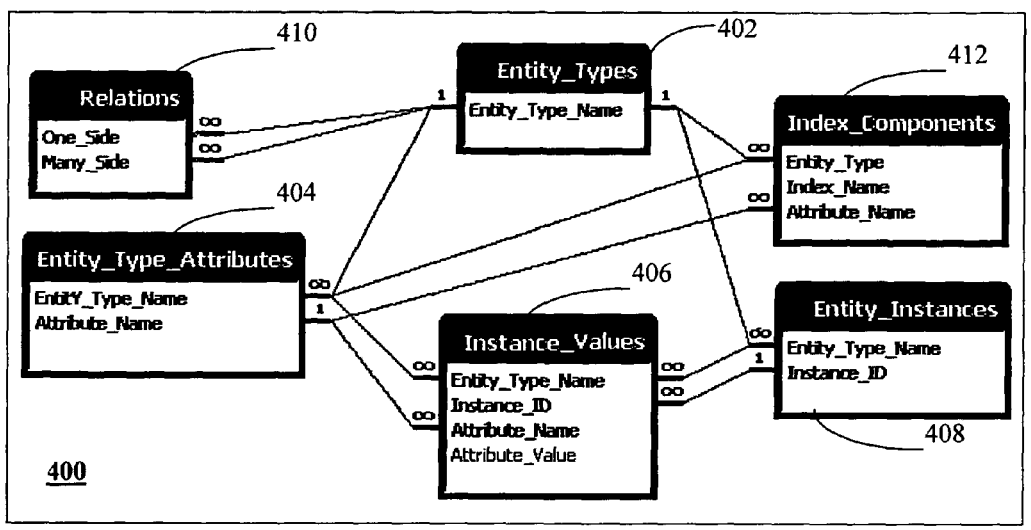
FIG. 4 shows an exemplary sub-schema for a generic representation of traditional tables and records according to the present invention.
Figure 5:
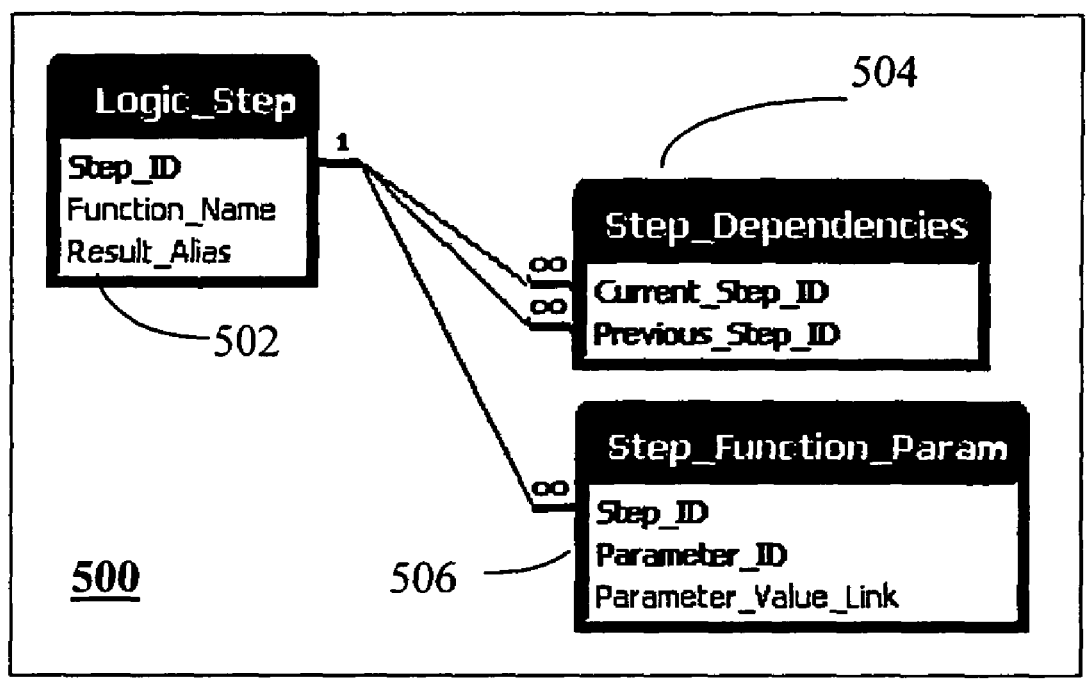
FIG. 5 shows an exemplary sub-schema for a generic representation of business logic according to the present invention.
Figure 6:
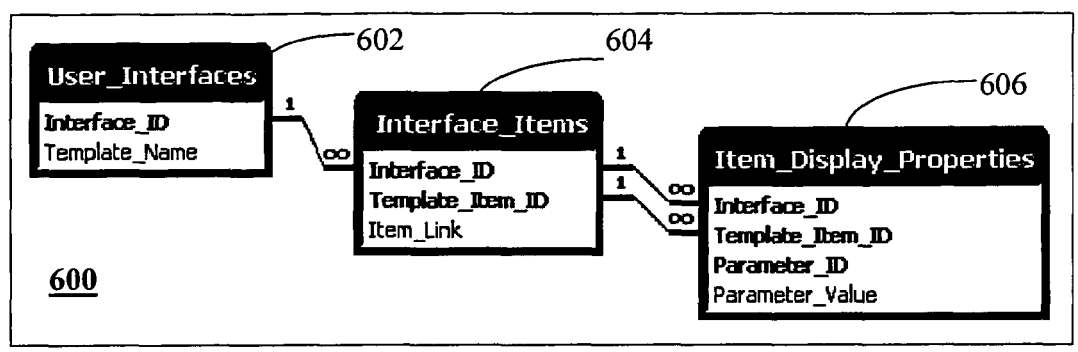
FIG. 6 shows an exemplary sub-schema for a generic representation of user interfaces according to the present invention.
Figure 7:
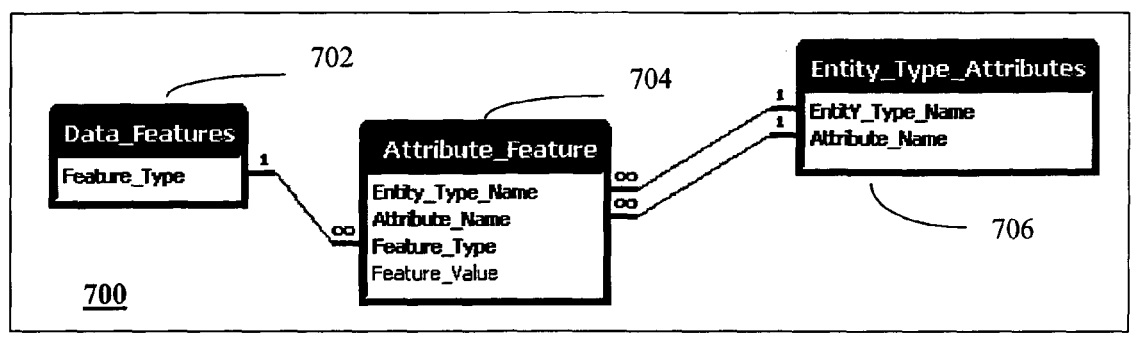
FIG. 7 shows an exemplary sub-schema for a generic representation of data item properties according to the present invention.
Figure 8:
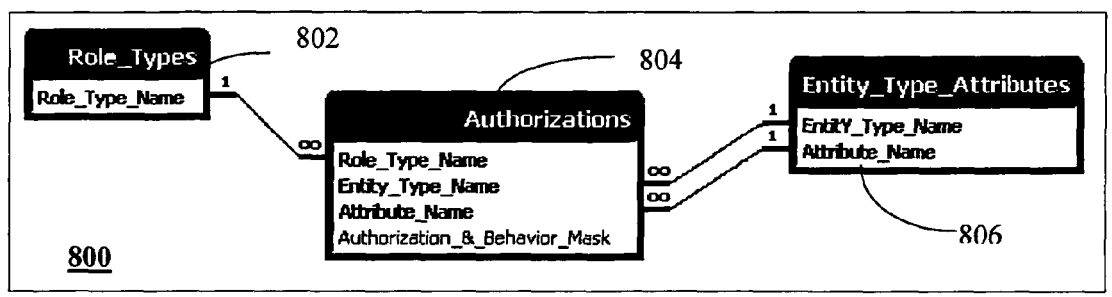
FIG. 8 shows an exemplary sub-schema for a generic representation of authorizations according to the present invention.
Figure 9:
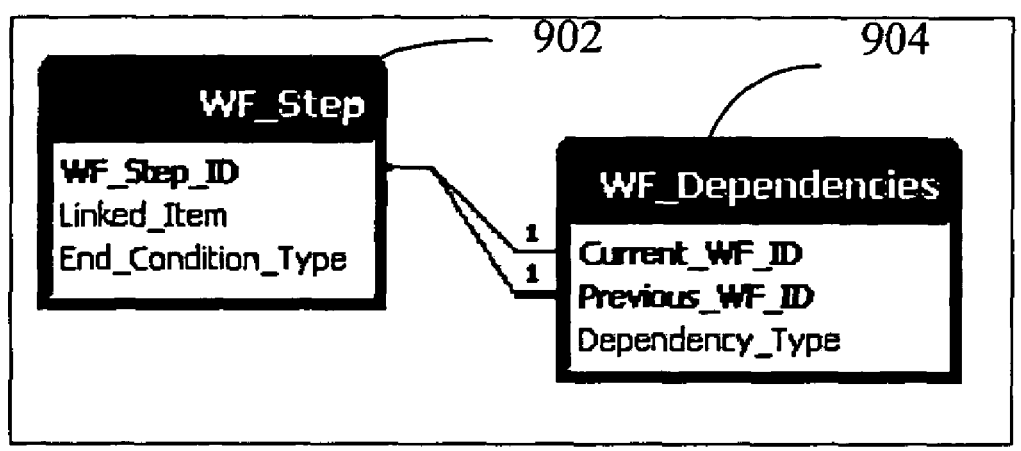
FIG. 9 shows an exemplary sub-schema for a generic representation of workflow according to the present invention.

Database environment 204 comprises a management system 218 similar to M.S. 118 in FIG. 1, a GMD schema 220, and business and application data 216. GMD schema 220 represents all business and application components. The GMD schema comprises several sub-schemas, each sub-schema representing a generic structure capable of supporting any functionality in a relevant sub-aspect. Exemplary sub-schemas are shown and discussed in detail below. For example, FIG. 4 shows an exemplary sub-schema for a generic representation of traditional tables and records. FIG. 5 shows an exemplary sub-schema for a generic representation of a business logic. FIG. 6 shows an exemplary sub-schema for a generic representation of user interfaces. FIG. 7 shows an exemplary sub-schema for a generic representation of data item properties. FIG. 8 shows an exemplary sub-schema for a generic representation of authorizations. FIG. 9 shows an exemplary sub-schema for a generic representation of a workflow. The generic-rigid representation ensures that there is no need for adjustment in the schema in order to support any business or applicative use. Business and application data 216 contains both data related to specific business entities similar to business data 120 in FIG. 1, and data related to application components similar to application data 114 in FIG. 1. In contrast with prior art architectures exemplified by FIG. 1, all data related to business and application components are now stored only in the database environment.

Figure 2B:
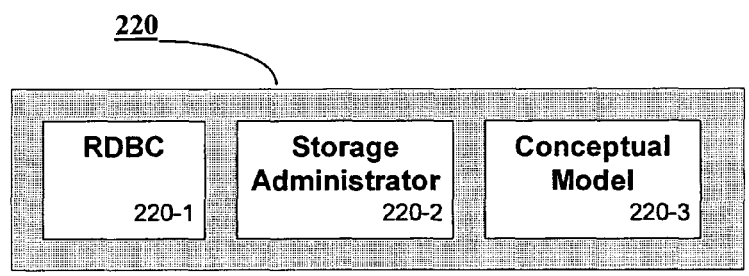
FIG. 2b shows the internal organization of the GMD schema;.

FIG. 2b shows the internal organization of the GMD schema. Schema 220 comprises a Relational Database Connectivity (RDBC) 220-1 mechanism operative to provide connectivity between a traditional application and records in the GMD schema of the present invention. RDBC 220-1 translates objects, stored as records in the GMD schema of the present invention, into common relational tables and vice versa. A record in the GMD schema may represent a table, a field, a constraint or any other element of a traditional schema. A record in the GMD schema may further represent an application component such as a screen, a report, a control or a property of an application component. Each said record is assigned to at least one application version. Schema 220 further comprises a storage administrator 220-2 operative to provide physical storage of the records of the schema, including a physical differentiation between records related to different application versions. The physical differentiation means storing records related to different versions in different spaces. Schema 220 further comprises a conceptual model component 220-3 operative to represent the logical structure of the GMD schema and its sub-schemas. Although the conceptual model of the GMD schema may also be implemented in a regular commercial RDBMS environment that lacks the GMD connectivity mechanism and the storage administrator, its function will be impaired because of lack of these dedicated components.

As mentioned, the GMD schema represents not only business entities but also definitions and properties of all application components. As further mentioned, those definitions and properties are no longer part of the application environment, but part of the database environment. Moreover, the representation is generic in the sense that it enables representation of any business and application component. The generic schema is also rigid in the sense that there is no need to make any change in it in order to support any specific business and/or application use. Business components and application components are represented as records in the GMD schema. This represents a major inventive feature of the present invention.

Because of the mutual relationships between an application and its business data (stored as records in the database environment), the changing of those records has now no effect on the application environment. This independence contrasts with prior art IS architectures, in which properties of application components are stored in the application environment rather than in the database environment (as business data), and therefore have great effect over the application environment.

Figure 3:
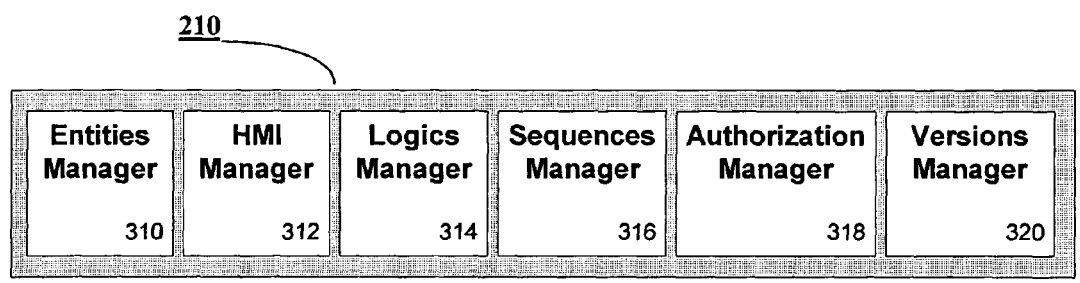
FIG. 3 shows schematically exemplary main managers of the Generic Builder and Runner (GBR) system of the present invention.

FIG. 3 shows a preferred embodiment of GBR editors 210. These editors-managers are designed for naïve (no programming background) end users, and enable them to define all business and application components throughout the application lifetime. An editing operation that uses these editors requires neither programming background on the part of the operator, nor code development, system/application upgrading or any other interruption of the regular running of the production application. Each editor is now described in detail.

GBR editors-managers 210 preferably comprise an "Entities Manager" 310, a "Human Machine Interfaces (HMI, also known as "user interfaces") Manager" 312, a "Logics Manager" 314, a "Sequences Manager" 316, an "Authorizations Manager" 318, and a "Version Manager" 320. Each manager is connected to M.S. 212 through which it gets operation utilities and services as well as connection to external environments including database environment 204.

The function of each component is as follows: Entities Manager 310 manages business entities, their attributes and referential relations between the business entities. According to the traditional IS approach, all these should be represented as specific tables, fields, constraints, etc., according to their specific use. In contrast, according to the GBR approach of the present invention, they are always represented as records in the same generic database schema. HMI Manager 312 manages various types of user interfaces, including screens, forms, dialogs, reports and Web pages. It also manages outline structure, internal partitioning, raw data fields, resulted /calculated fields, and all types of controlling components. The HMI manager further manages the display and behavior definitions of each data item and control. Logics Manager 314 manages business logic components starting with parameters, formulas and functions, and ending with complex operation building blocks and algorithmic stages. Sequences Manager 316 manages the sequence of the flow of screens, algorithms and any action/operation flow. It also manages dependencies and transition conditions between stages, and enables formation of any net structure (i.e. the flow is not limited to a linear or to a tree structure, but can be of any net structure). Authorizations Manager 318 manages functional roles and their horizontal and vertical authorizations over each data item, as well as "Insert", "Update", "Delete", "Read-Only", "Not-Available", etc. authorizations over records and data items. System objects such as user interfaces, data items, operation units, and others are available and behave according to authorizations definitions. Version Manager 320 manages the version marking of each component.

The functionality, interaction and operation of the various components of the GBR system of the present invention will become more apparent through the use of examples that follow. In particular, these examples will clarify the operation and properties of the GMD schema, which, as mentioned, comprises several subschemas. The examples are divided into three types: a generic sub-schema example that demonstrates several sub-schemas for generic representation of business and application components; an applicative example that demonstrates a specific system and its mapping to those sub-schemas; and a Maintenance Processes example that demonstrates the flow of maintenance processes according to the existing (prior art) IS approach and according to the GBR approach disclosed herein.

EXAMPLE 1

Generic Sub-Schemas

FIG. 4 shows an exemplary sub-schema 400 for a generic representation of traditional tables and records according to the present invention. This sub-schema includes a fixed set of tables for any IS application. It can represent the business schema of an "Hour Report" example (see FIG. 7) as well as of any other IS application. Sub-schema 400 preferably comprises the following tables (the lines and symbols between the tables are Microsoft Access notations for Foreign keys (constraints)): an Entity_Types table 402, an Entity_Type_Attributes table 404, an Instance_Values table 406, an Entity_Instances table 408, and optionally, a Relations (Constrains) table 410 and an Index-Components table 412. The tables mentioned as optional (410 and 412) are tables that are not required for the representation of business-functional objects. They are shown in order to illustrate the possibility to represent not only business objects but also relations-constraints (410) and indexes (412), which are technical components of a relational database, regardless of its use.

Each of these tables includes one or more fields. For example, table 402 has an "Entity_Type_Name" field, which gives a table a name. Each record in table 402 represents a "Table" in a traditional (prior art) database. The various tables in FIG. 4, their fields and their respective function are described in more detail in each table.

TABLE 402

"Entity_Types"
Each record (in this table) represents a Table in a traditional database.

| Field Name | Field Description |
|---|---|
| Entity_Type_Name | "Table" name |

TABLE 404

"Entity_Type_Attributes"
Each record (in this table) represents a Field in a traditional database.

| Field Name | Field Description |
|---|---|
| EntitY_Type_Name | "Table" name |
| Attribute_Name | "Field" name |

TABLE 406

"Instance_Values"
Each record (in this table) represents Value
of a certain "Field" at a certain "Record".

| Field Name | Field Description |
|---|---|
| Entity_Type_Name | "Table" name |
| Instance_ID | "Record" identification |
| Attribute_Name | "Field" name |
| Attribute_Value | "Field" value |

TABLE 408

"Entity_Instances"
Each record (in this table) represents a Record ID in a traditional table

| Field Name | Field Description |
|---|---|
| Entity_Type_Name | "Table" name |
| Instance_ID | "Record" identification |

TABLE 410

"Relations" (optional)
Each record (in this table) represents a Constraint in a traditional database

| Field Name | Field Description |
|---|---|
| One_Side | The instructive "Table" |
| Many_Side | The constrained "Table" |

TABLE 412

"Index_Components" (optional)
Each record (in this table) represents a Field involved in a certain traditional index

| Field Name | Field Description |
|---|---|
| Entity_Type | "Table" name |
| Index_Name | "Index" name such as Primary-key or Secondary-key |
| Attribute_Name | An involved "Field" |

FIG. 5 shows an exemplary sub-schema 500 for a generic representation of a business logic calculation according to the present invention. Sub-schema 500 preferably comprises the following tables: a Logic_Step table 502, a Step_Dependencies table 504 and a Step_Function_Parameter table 506. As in the description of FIG. 4, each table has a number of fields with respective names and functions, described in each table. The structure shown in FIG. 5 supports the LISP programming language in that it allows any LISP expression to be displayed as records in the sub-schema. Like LISP, sub-schema 500 is an "expression-oriented" structure in which an expression produces a value (or a list of values) which can then be embedded into other expressions. References to the LISP language are well known in the art. The structure shown in FIG. 5 can therefore support any logic calculation and store it as records in sub-schema 500. In contrast, logic calculation is represented in existing IS architectures as lines of code or as "macro" lines, not as records in a database.

TABLE 502

"Logic_Step"
Each record represents a logical step in the entire calculation

| Field Name | Field Description |
|---|---|
| Step_ID | Step identification |
| Function_Name | The name of the function performed at this step. |
| Result_Alias | An alias name for the calculation result. The result can be a value or a list of values, which then can be embedded into another expression (i.e. Function_Name). |

TABLE 504

"Step_Dependencies" - Each record represents a dependency between two steps, enabling formatting of any net structure.

| Field Name | Field Description |
|---|---|
| Current_Step_ID | Current step identification |
| Previous_Step_ID | Identification of other step, earlier to the current one. |

TABLE 506

"Step_Function_Param"
Each record represents a parameter of the function performed in a step.

| Field Name | Field Description |
|---|---|
| Step_ID | Step identification |
| Parameter_ID | Identification of a parameter of the performed function. A parameter can be of an argument, operator, function, or even Function_Name. |
| Parameter_Value_Link | Identification of the data item that contains the value to be assigned to the parameter. It can contains a specific value, a list of values, an address, a name, or any other expression result. |

FIG. 6 shows an exemplary sub-schema 600 for a generic representation of user interfaces according to the present invention. Sub-schema 600 preferably comprises the following tables: a User_Interfaces table 602, an Interface_Items table 604 and an Item_Display_Properties table 606. These items can stand for data items as well as for controls. As in the descriptions of FIGS. 4 and 5 each table has a number of fields with respective names and functions, described in each table.

TABLE 602

"User_Interfaces" - Each record represents a user interface

| Field Name | Field Description |
|---|---|
| Interface_ID | Interface identification |
| Template_Name | The name of the template used for this interface |

TABLE 604

"Interface_Items" - Each record represents a dependency between two steps, enabling formatting of any net structure

| Field Name | Field Description |
|---|---|
| Interface_ID | Interface identification |
| Template_Item_ID | Identification of an item at the template in use |
| Item_Link | Identification of the data item or of the control to be displayed for this template item. The data item can be either a raw data item, such as those stored in table 404, or an item composed through a logical calculation represented in table 502. |

TABLE 606

"Item_Display_Properties"
Each record represents a parameter of the function performed in a step

| Field Name | Field Description |
|---|---|
| Interface_ID | Interface identification |
| Template_Item_ID | Identification of an item in the template in use (either raw data item, composed data item, or a control). |
| Parameter_ID | Identification of a displaying-behaving attribute (parameter) |
| Parameter_Value | Value of a displaying-behaving attribute of an item at the template in use. |

FIG. 7 shows an exemplary sub-schema 700 for a generic representation of data item properties according to the present invention. Sub-schema 700 preferably comprises the following tables: a Data_Feature table 702, an Attribute_Feature table 704 and an Entity_Type_Attribute table 706, the latter identical with table 404 shown in FIG. 4 and in FIG. 8. The Entity_Type_Attribute table is also shown here to emphasize the integrity of the sub-schemas of FIGS. 4 and 8. As in the descriptions of FIGS. 4, 5 and 6, each table has a number of fields with respective names and functions, described in each table.

TABLE 702

"Data_Feature" - Each record represents one kind of a possible feature

| Field Name | Field Description |
|---|---|
| Feature_Type | Identification of a possible feature such as Input mask, Error Message, Validity rule etc. |

TABLE 704

"Attribute Feature" - Each record represents the appearance of a specific Feature of a specific Entity Attribute.

| Field Name | Field Description |
|---|---|
| Entity_Type_Name | "Table" name |
| Attribute_Name | "Field" name |
| Feature_Type | Identification of a specific feature |
| Feature_Value | Value of the specific feature |

TABLE 706

Table 404 shown in FIG. 4

FIG. 8 shows an exemplary sub-schema 800 for a generic representation of authorizations according to the present invention. Sub-schema 800 preferably comprises the following tables: a Role Types table 802, an Authorizations table 804 and an Entity_Type_Attribute table 806, which is identical with table 404 (FIGS. 4 and 7), and shown here in order to emphasize the integrity of the sub-schemas of FIGS. 4, 7 and 8. As in the descriptions of FIGS. 4-7, each table has a number of fields with respective names and functions, described in each table.

TABLE 802

"Role Types" - Each record represents one type of a possible role

| Field Name | Field Description |
|---|---|
| Role_Type_Name | Role identification by its name |

TABLE 804

"Authorizations" - Each record represents the appearance of a specific Authorization and Behavior mask (pattern) of a specific role over a specific data item.

| Field Name | Field Description |
|---|---|
| Role_Type_Name | "Role" name |
| Entity_Type_Name | "Table" name |
| Attribute_Name | "Field" name |
| Authorization_&_Behavior_Mask | Authorization and behavior pattern, represented as a mask. |

TABLE 806

Table 404 shown in FIG. 4

FIG. 9 shows an exemplary sub-schema 900 for a generic representation of workflow (WF) according to the present invention. Sub-schema 900 preferably comprises a WF_Step table 902 and a WF_Dependencies table 904. Such generic representation enables formation of a flow of any net structure (i.e. the flow is not limited to a linear or to a tree structure, but can be of any net structure). Moreover, terminating conditions (rules type) and dependencies conditions enable formation of any conditioning among these the components. As in the descriptions of FIGS. 4-8, each table has a number of fields with respective names and functions, described in each table.

TABLE 902

"WF_Step" - Each record represents one step of a specific workflow (business process as well as system process)

| Field Name | Field Description |
|---|---|
| WF_Step_ID | Workflow step identification |
| Linked_Item | Identification of the executed component in the current step (screen, operation, calculation, etc). |
| End_Condition_Type | Terminating condition-rule type. |

TABLE 904

"WF_Dependencies" - Each record represents a dependency between two steps, enabling formatting of any net structure.

| Field Name | Field Description |
|---|---|
| Current_WF_ID | Current workflow step identification. |
| Previous_WF_ID | Previous workflow step identification. |
| Dependency_Type | Dependency condition-rule type. |

EXAMPLE 2

Applicative Example

Figure 10A:
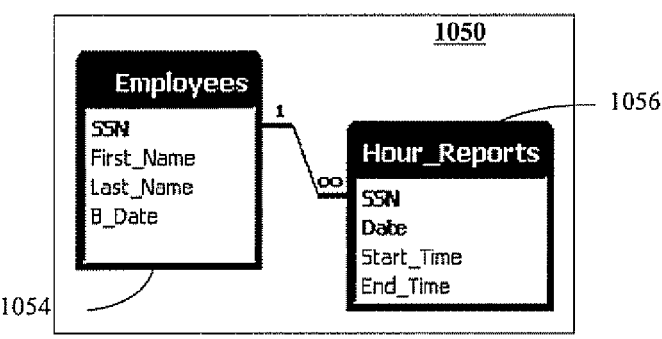
FIG. 10a illustrates an example of a specific schema in a prior art IS architecture, related to hours reported by employees belonging to one common pool (stage A of the "hours report" example)
Figure 10B:
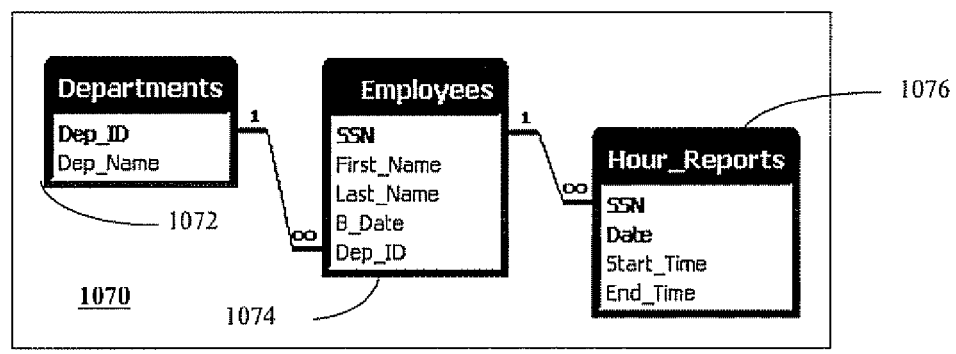
FIG. 10b illustrates an example of a specific schema in a prior art IS architecture, related to hours reported by employees belonging to several different departments (stage B of the "hours report" example)

This section demonstrates a specific system and its mapping to the sub-schemas of FIGS. 4-6. Let us consider the situation in which the organization that employees belong to is a small one and has no separate departments (Stage A). In this case, the relevant business schema is represented by the traditional schema shown in FIG. 10a. This schema is different from the one shown in FIG. 10b, which represents a situation in which the organization is a larger one with several different departments (Stage B). FIG. 10 is explained next, starting with (b) and following with (a).

FIG. 10b illustrates an exemplary traditional business schema 1070 of a specific "Hours Report" IS application, related to working hours reported by employees belonging to several different departments, as done in prior art. Schema 1070 comprises a Departments table 1072, an Employees table 1074 and an Hour Reports table 1076. Table 1072 includes the following fields: a department identification Dep_ID and a department name Dep_Name. Table 1074 includes the following fields related to employee information: Social Security Number (SSN), first name, last name, birth date (B_Date) and department identification. Table 1076 includes the following fields related to worked 20 hour information for each employee: SSN, date, work start time and work finish time. In addition, schema 1070 includes two constraints, related to these tables and illustrated as a line with the symbols of 1 and ∞ at its ends.

FIG. 10a illustrates an exemplary traditional business schema 1050 of a specific "Hours Report" IS application, related to working hours reported by employees belonging 25 to one common pool, as done in prior art. Schema 1050 does not include the Departments table 1072 of FIG. 10b above, but includes an Employees table 1054 and an Hour Reports table 1056. Employees table 1054 does not include the Dep_ID field of Employees table 1074 in FIG. 10b, because there are no different departments in the organization. Except for these differences, all other features in FIGS. 10a and 10b are identical.

The limitations and disadvantages of this prior art specific schema arise from the fact that the tables and fields in each of FIGS. 10a and 10b are specific tables and fields (i.e. schema elements) rather than records. In prior art, these are always specific tables and fields of a specific business schema (hence its name). In contrast, in the GMD schema disclosed herein there are no specific business tables or fields, and these components are represented as records in the GMD schema. The problems of a specific representation of tables and fields as done in prior art include the need to:
  Add/remove tables—for example to move from a situation in which the organization does not have different departments (all employees are of one pool) to one in which the employees belong to different departments. That is, move from the schema shown in FIG. 10a to the schema shown in FIG. 10b.
  Add/remove fields—in order to add attributes to a business entity.
  Add/remove constraints—in order to enforce referential integrity between tables (business entities).

FIG. 11 illustrates a mapping of the specific "Hours Report" schema (shown in FIG. 10b) into the generic sub-schema of the present invention shown in FIG. 4. Each table in FIG. 11 relates to a table in FIG. 4 (marked by the table name and the number in the top line of each table). Each line in the tables of FIG. 11 presents a record in the generic schema. All the lines (bold and regular) are records needed to represent the sub-schema shown in FIG. 10b. All lines except bold lines with a "*" sign are records needed to represent the sub-schema shown in FIG. 10a.

The mapping in FIG. 11 is used to illustrate that any IS schema can be easily mapped into the generic schema (GMD) of the present invention (with no information loss), in order to gain its advantages, e.g. on the fly total application editing. As clearly shown in FIG. 11, in the generic GBR approach of the present invention, traditional database schema elements are represented as records, and therefore any change of a business object/entity does not affect the database schema.

EXAMPLE 3

Maintenance Processes

This section demonstrates a flow of maintenance processes according to the existing traditional approach to IS and according to the present GBR approach to IS. Maintenance processes are related to editing of components such as "schema", "user interface", "workflow", "business logic calculation", and any other possible changes of the business or application definitions.

Figure 12:
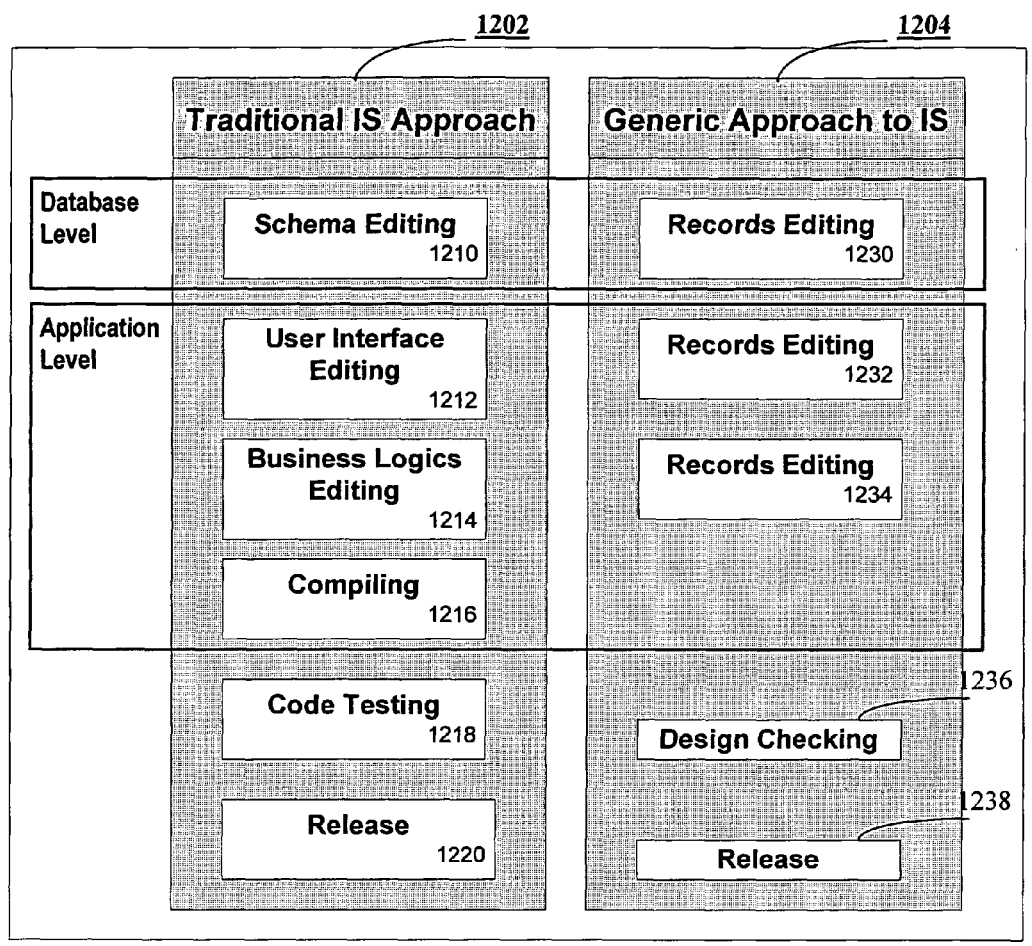
FIG. 12 shows a comparison of the main steps of a development and/or maintenance process flow in a traditional (prior art) IS approach and in the generic approach of the present invention.

FIG. 12 shows in side-by-side flow charts a comparison of the main steps of a maintenance process flow in a traditional IS approach and in the generic approach of the present invention. Some steps occur at the database level, and some at the application level.

Database Level

The "Hours Report" example, with the traditional schema (FIGS. 10a and 10b) and its mapping (FIG. 11) into the generic sub-schema of FIG. 4, illustrated the differences between traditional and GBR approaches to a business schema. As mentioned, in the generic GBR approach traditional database schema elements are represented as records, and therefore any change of business object /entity does not affect the database schema.

Application Level—User Interface

In view of the "Hours Report" example above, let us follow two situations, related to two stages in the growth process of an organization: Stage A, in which the organization is small and has no departments but only a common pool of employees, and stage B, in which the organization has grown and has now several departments, each employee belonging now to a specific department. Let us assume that there is an information system that supports an "Hours Report" application in stage A, and that we would like to make the following changes in this "Hours Report" application, in order to adjust it to the new situation (stage B):
  1. Add a department name, beside the employee name, in an existing form (user interface), which already presents the hours report of an employee.
  2. Create a new form presenting a list of employees of a specific department.

Let us follow the required maintenance processes, related to creation and editing of user interfaces, using the traditional IS approach, column 1202 in FIG. 12 and the GBR one, column 1204 in FIG. 12. Differences at the database level were presented at the previous section (business schema editing (step 1210) according to the traditional IS approach, versus records editing (step 1230) according to the GBR approach).

In case the application is a traditional IS one, there is a need to edit the existing form and to create the new one (step 1212). In case there is a need to make a logical-calculation editing, it would be done in step 1214. Following, there is a need to compile the application and to create a new executable version (step 1216). Following that, the code is tested (step 1218), and finally a new version is released (step 1220).

In contrast, in case the application is a GBR IS application, the existing form is based upon a Form Template. Therefore, as shown in the sequence of steps in column 1204, there is only a need to edit the user interfaces records in step 1232, edit records regarding business logics in step 1234 (which is not needed in the current example), check the design in step 1236 (which is not needed in the current example), and release the application in step 1238 (which is not needed in the current example). That is to say that there is no need for compiling, no need for a new executable version, and no need for a new release.

Figure 13:
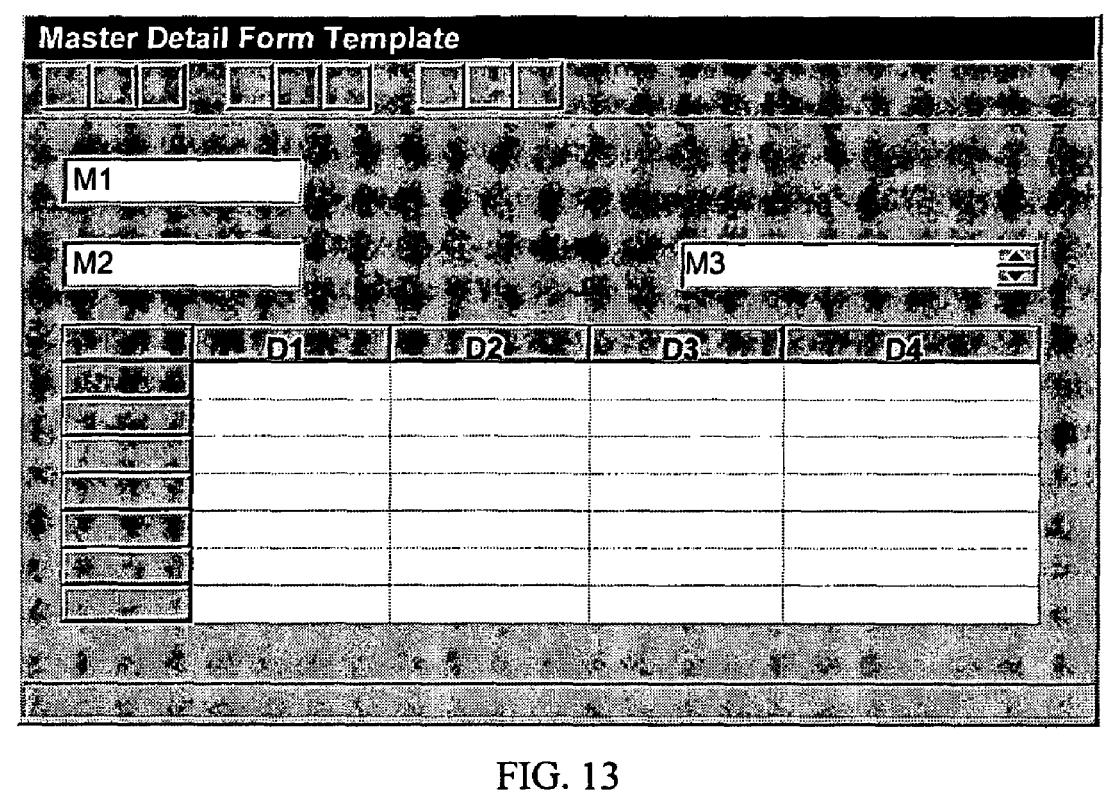

Any form in a GBR application is based upon a template. The GBR may provide a template of a "Master-Details Form", as shown in FIG. 13. The template is a utility-service provided by the GBR M.S. (shown in FIG. 2). Therefore, the user interface (form) in a GBR application is a set of records defining which data item is placed in each template position. In FIG. 13, M1, M2 . . . M# represent fields in the "Master" part of the form (user interface) and D1, D2 . . . D# represent fields in the "Details" part of the form (user interface). There are no limits concerning the number of fields that can be displayed in each part.

FIGS. 14a and 14b illustrate the specific records in the user interfaces sub-schema of FIG. 6, based upon the "Master Detail" template shown on FIG. 13. Each table in FIGS. 14a and 14b relates to a table in FIG. 6 (marked by the table name and number in the top s line of each table). FIG. 14a illustrates existing records in Stage A, while FIG. 14b illustrates the records in stage B. Bold lines of text in FIG. 14b represent new records, which were added to the user interfaces sub-schema in order to apply the required changes (adding a department name to an exiting form named "Employee's report", and creating an additional report under the name "Department's employees").

Application Level—Business Logics

Assume we would like to make the following logical calculation: first add A to B, and then multiply it by C. FIG. 15 illustrates records in the business-logics-calculation sub-schema of FIG. 5, which represent the calculation above. Each table in FIG. 15 relates to a table in FIG. 5 (marked by the table name and number in the top line of each table). Each line in FIG. 15 presents a record in the generic schema shown on FIG. 5. Note that the generic schema enables representation of any net structure (supporting any calculation branching), as well as any function expression.

Compiling and Testing

As mentioned, according to the GBR approach of the present invention, schema elements, user interfaces, business logics, workflows, as well as any other business and application definitions are all represented as records in the GMD schema. Consequently, any change in business or application functionality leaves the database schema or application "code" unchanged. Specifically and advantageously, the generic approach to IS disclosed herein neither has, nor requires code and/or specific tables. This generic approach requires only definitions stored as records in a common generic schema, a schema that remains unchanged regardless of the application. Therefore, there is no need for compiling and code testing. As in any other design processes, there is a need for functional checking of the design, but there is no need for syntax checkup or any other checkups that relate to code testing. Consequently, the release itself of the new application version after making any changes is much simpler as well.

In summary, the GBR system disclosed herein enables on the fly editing, i.e. on the fly changes in the database schema, in the HMI (screens, dialogs and reports), business logics (formulas, functions and algorithms) and business processes (operation and flow conditions, operation and flow sequences, stages and stage content). The GBR provides the following major advantages:

No need to make any change in the GMD schema. The generic format of the schema supports any possible business and application need or use, with no need for any adjustment. In other words, such changes will not require any code development or any version updates of an application.

No need to produce a new application version or any ad-hoc patches subsequent to functional changes in an application.

Capability to meet any business and application requirement with no need to make any change in the application environment, because definitions and properties of all application components are represented as data items in the GMD schema.

An application may be run continuously, without interruption, while the changes are applied to the generic database schema.

End-user independency concerning the entire business functionality. The development and maintenance of information systems incorporating the GBR of the present invention may be done by individuals who do not need to have any programming background. That is to say there is no need to involve programmers in the business functionality aspects of the application.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for developing and maintaining an information system that includes an application environment and a database system, said database system including business components and application components, the method comprising the steps of:
 a. providing a generic and rigid database (GMD) schema operative to represent all said business components and application components as records physically stored in a storage mechanism included in said schema; and
 b. using said generic and rigid schema that includes general-generic tables and which is used to build, run and maintain said information system and to effect operations on said business components and application components in a codeless way, by adding, deleting or changing values in said records.

2. The method of claim 1, wherein said step of providing a generic and rigid schema operative to represent all said business and application components as said records includes
 i. providing a conceptual model operative to provide a logical representation of said GMD schema and said records;
 ii. providing a relational database connectivity (RDBC) mechanism operative to provide connectivity between a traditional application and said records, related to different record versions; and iii. providing a storage mechanism operative to provide physical storage of said records.

3. The method of claim 1, wherein said step of providing a GMD schema further includes providing a plurality of sub-schemas, each said sub-schema representing a generic structure capable of supporting any functionality of a relevant sub-aspect of said business and application components.

4. The method of claim 1, further comprising the step of providing, in the application environment, at least one editor-manager coupled to said GMD schema and operative to build, run and maintain the information system and to effect operations on said business and application components in a codeless way, by changing values in said records.

5. The method of claim 1, further comprising the steps of providing, in the database system, business and application data related to said business and application components and providing a management system operative to serve as a kernel of said database system.

* * * * *